(12) United States Patent
Kato (10) Patent No.: US 9,327,736 B2
(45) Date of Patent: May 3, 2016

(54) METHOD FOR MANUFACTURING VEHICLE BODY FRAME

(75) Inventor: Yoshinori Kato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 336 days.

(21) Appl. No.: 13/817,255

(22) PCT Filed: Jan. 11, 2011

(86) PCT No.: PCT/JP2011/050275
§ 371 (c)(1),
(2), (4) Date: Apr. 5, 2013

(87) PCT Pub. No.: WO2012/046458
PCT Pub. Date: Apr. 12, 2012

(65) Prior Publication Data
US 2013/0185941 A1   Jul. 25, 2013

(30) Foreign Application Priority Data

Oct. 5, 2010   (JP) .................................. 2010-225789

(51) Int. Cl.
*B61D 17/00*   (2006.01)
*B23K 9/02*   (2006.01)
(Continued)

(52) U.S. Cl.
CPC . *B61D 17/00* (2013.01); *B23K 9/02* (2013.01); *B23K 20/122* (2013.01); *B23K 28/02* (2013.01); *B61D 17/04* (2013.01);
(Continued)

(58) Field of Classification Search
CPC .. Y10T 29/49622; Y02T 30/34; B61D 17/00; B61D 17/04; B23K 20/122; B23K 28/02; B23K 9/02; B23K 2201/006
See application file for complete search history.

(56) References Cited

U.S. PATENT DOCUMENTS 1,340,551 A * 5/1920 Madsen ......................... 81/3.32
3,158,879 A * 12/1964 Barrett .............................. 7/151
(Continued)

FOREIGN PATENT DOCUMENTS

CN        1269607      8/2006
JP        6-227391     8/1994
(Continued)

OTHER PUBLICATIONS

International Search Report mailed Apr. 19, 2011 in International (PCT) Application No. PCT/JP2011/050275 with English Translation.

(Continued)

*Primary Examiner* — Richard Chang
(74) *Attorney, Agent, or Firm* — Wenderoth, Lind & Ponack, L.L.P.

(57) ABSTRACT

A method of manufacturing a vehicle body frame including a roof structure, side structures that face each other, and a floor structure is provided. The method includes a primary joining step of butt-joining only a first set of face plates among inner face plates and outer face plates of a plurality of panel boards that form the side structures, and manufacturing intermediate bodies of the side structures; a structure joining step of joining the roof structure, the floor structure, and the intermediate bodies; and a secondary joining step of joining, after the structure joining step, a second set of face plates among the inner face plates and the outer face plates of the plurality of panel boards that form the intermediate bodies to complete the side structures.

11 Claims, 9 Drawing Sheets

(51) Int. Cl.
*B23K 20/12* (2006.01)
*B23K 28/02* (2014.01)
*B61D 17/04* (2006.01)

(52) U.S. Cl.
CPC ........... *B23K 2201/006* (2013.01); *Y02T 30/34* (2013.01); *Y10T 29/49622* (2015.01)

(56) References Cited

U.S. PATENT DOCUMENTS

| | | | | |
|---|---|---|---|---|
| 3,343,260 | A | * | 9/1967 | Rogers .............................. 30/248 |
| 3,407,424 | A | * | 10/1968 | Lanzarone et al. ............. 15/145 |
| 3,505,901 | A | * | 4/1970 | Stone ........................... 74/551.4 |
| 3,545,551 | A | * | 12/1970 | Niemeyer ..................... 172/371 |
| 3,552,760 | A | * | 1/1971 | Sine ............................... 280/653 |
| 3,562,837 | A | * | 2/1971 | Baginski et al. ........... 15/230.11 |
| 4,074,411 | A | * | 2/1978 | Willard et al. .................. 29/411 |
| 4,295,392 | A | * | 10/1981 | Peck ............................... 81/3.32 |
| 4,414,869 | A | * | 11/1983 | Augustine ....................... 82/128 |
| 4,520,542 | A | * | 6/1985 | Villanyi .......................... 29/224 |
| 4,598,613 | A | * | 7/1986 | Baum ............................. 81/3.37 |
| 4,680,993 | A | * | 7/1987 | Feliz .............................. 81/3.37 |
| 4,707,900 | A | * | 11/1987 | Twogood et al. ............... 29/244 |
| 4,908,925 | A | * | 3/1990 | Johnson .......................... 29/260 |
| 5,016,499 | A | * | 5/1991 | Saveland ....................... 81/3.37 |
| 6,584,912 | B2 | | 7/2003 | Forbes |
| 6,601,279 | B2 | * | 8/2003 | Scott ............................... 29/259 |
| 7,231,850 | B2 | * | 6/2007 | Wang ............................... 81/3.2 |
| 8,276,253 | B2 | * | 10/2012 | Herbold et al. ................. 29/282 |
| 8,651,047 | B1 | * | 2/2014 | Uri ................................. 118/504 |
| 8,713,776 | B2 | * | 5/2014 | Herbold .......................... 29/282 |

FOREIGN PATENT DOCUMENTS

| | | |
|---|---|---|
| JP | 11-314181 | 11/1999 |
| JP | 2001-171514 | 6/2001 |
| JP | 2001-239375 | 9/2001 |
| JP | 2001-239376 | 9/2001 |
| JP | 3224092 | 10/2001 |
| JP | 3229282 | 11/2001 |
| JP | 2002-284001 | 10/2002 |
| JP | 2004-243379 | 9/2004 |
| JP | 2004-261900 | 9/2004 |
| JP | 2005-66643 | 3/2005 |
| JP | 3807766 | 8/2006 |
| JP | 2007-055345 | 3/2007 |
| JP | 2007-260691 | 10/2007 |
| JP | 2009-298333 | 12/2009 |
| JP | 2010-47029 | 3/2010 |

OTHER PUBLICATIONS

Written Opinion of the International Searching Authority mailed Apr. 19, 2011 in International (PCT) Application No. PCT/JP2011/050275 with English Translation.

Chinese Office Action issued Sep. 19, 2014 in corresponding Chinese Patent Application No. 201180037282.7 with English translation.

* cited by examiner

METHOD FOR MANUFACTURING VEHICLE BODY FRAME

TECHNICAL FIELD

The present invention relates to a method of manufacturing a vehicle body frame formed by joining a roof structure, side structures that face each other, and a floor structure.

Priority is claimed on Japanese Patent Application No. 2010-225789 filed on Oct. 5, 2010, the contents of which are incorporated herein by reference.

BACKGROUND ART

Generally, the vehicle body frame of a track vehicle is manufactured by joining a roof structure, side structures that face each other, and a floor structure.

A method of manufacturing such a vehicle body frame is described in the following Patent Document 1, for example. In the technique described in this Patent Document 1, structures, such as side structures, are formed by a plurality of panel boards called double skin. The panel board has an inner face plate and an outer face plate that face each other, and a plurality of ribs that connect the inner face plate and the outer face plate. In the technique described in this Patent Document 1, a side structure is formed by joining outer face plates of a plurality of panel boards by friction-stir welding, and inner face plates of the plurality of panel boards by welding or the like. The side structures formed as described above, the roof structure, and the floor structure are joined to manufacture a vehicle body frame.

CITATION LIST

Patent Document

Patent Document 1: Japanese Patent Application, First Publication No. 2002-284001

Technical Problem

In the technique described in the above Patent Document 1, distortion occurs between the panel boards under the influence of joining heat or the like in the process of joining a plurality of inner face plates of the panel boards and joining a plurality of outer face plates thereof. Therefore, a second panel board adjacent to a first panel board may not be joined to the first panel board at a target angle. In this case, it is necessary to remove the distortion between the first panel board and the second panel board.

Incidentally, since the first panel board and the second panel board are joined between their inner face plates and between their outer face plates, the connection rigidity between the first panel board and the second panel board is high. For this reason, in the technique described in Patent Document 1, there are problems in that a large amount of labor is required to remove the distortion between the panel boards and the man-hours of the vehicle body frame increases.

Summary of Invention

Thus, an object of the present invention is to solve such problems in the related art and provide a method of manufacturing a vehicle body frame that can reduce the man-hours of a vehicle body frame.

Solution to Problem

A method of manufacturing a vehicle body frame related to the present invention for solving the problems is a method of manufacturing a vehicle body frame including a roof structure, side structures that face one another, and a floor structure, wherein the roof structure, the side structures, and the floor structure are formed by a plurality of panel boards each having an inner face plate, an outer face plate that faces the inner face plate, and a plurality of ribs disposed between the inner face plate and the outer face plate to connect the inner and outer face plates. The method of manufacturing the vehicle body frame includes a primary joining step of butt-joining only one set of face plates among the inner face plates and outer face plates of the plurality of panel boards that form the side structures, and manufacturing intermediate bodies of the side structures; a structure joining step of joining the roof structure, the floor structure, and the intermediate bodies; and a secondary joining step of joining, after the structure joining step, the other set of face plates among the inner face plates and the outer face plates of the plurality of panel boards that form the intermediate bodies to complete the side structures.

In this case, a distortion removal step of removing the distortion between the plurality of panel boards after the structure joining step may be further included in a case where it is necessary to remove the distortion between the plurality of panel boards.

In the manufacturing method concerned, one set of face plates are joined, the other set of face plates are not joined, and the distortion removal between the panel boards is performed in a state where the connection rigidity between the panel boards is low. Thus, the distortion between the panel boards can be very simply removed.

Here, in the method of manufacturing a vehicle body frame, when the other set of face plates are joined by welding in the secondary joining step, the distortion removal step may be executed during the secondary joining step by adjusting the amount of heat input to a welding portion.

Since the distortion removal and the secondary joining are simultaneously performed in the manufacturing method concerned, the manufacturing steps of the vehicle body frame can be simplified.

Additionally, in the method of manufacturing a vehicle body frame, the one set of face plates may be the outer face plates, and the outer face plates may be joined in the primary joining step.

In this case, in the primary joining step, the outer face plates may be joined by a friction-stir welding method.

In the manufacturing method concerned, the appearance of the joining portion of outer face plates can be cleaned.

Additionally, in the method of manufacturing a vehicle body frame, in the secondary joining step, the other set of faces plates are joined by welding methods other than the friction-stir welding method, specifically, fusion welding, such as MIG (Metal Inert Gas) welding or TIG (Tungsten Inert Gas) welding.

In the manufacturing method concerned, in the secondary joining step, joining can be carried out in order to support a joining portion without using a jig.

Additionally, in the method of manufacturing a vehicle body frame, the plurality of ribs may extend along a first direction, and may be aligned in a second direction perpendicular to the first direction, and in the primary joining step, the one set of face plates may be butt-joined in a state where the ribs of each of the plurality of panel boards are parallel to each other and the plurality of panel boards are aligned in the second direction.

In this case, in the structure joining step, a direction in which the plurality of panel boards that form the intermediate bodies may be aligned is a vertical direction, upper edges of the panel boards being located at upper ends of the side structures in the vertical direction may be joined to the roof structure, and lower edges of the panel boards being located at lower ends of the side structures in the vertical direction may be joined to the floor structure, and in the secondary joining step, the joining between a first panel board near the midmost in the vertical direction, and a second panel board adjacent to the first panel board near the midmost the may be performed at end of the secondary joining step.

In a case where the distortion removal step and the secondary joining step are firstly performed with respect to the panel board located at the upper end side of the vehicle body, and then the distortion removal step and the secondary joining step are secondly performed with respect to the panel board located at the lower side of the vehicle body, finally, the distortion removal step and the secondary joining step are performed with respect to the panel board located at the bottom side of the vehicle body.

If the distortion removal and the secondary joining are performed in this order, and if lower panel boards adjacent to an upper panel board in a plurality of panel boards are all inclined to the right side, the deviation amount of lower ends of the lower panel boards to the right side with respect to the upper panel board is accumulated whenever the secondary joining is performed. When the secondary joining is performed on a panel board at a lowest end and a panel board thereabove, the deviation amount of the lower end of the panel board to the right side will become quite large. For this reason, in a case where the secondary joining between adjacent panel boards is performed whenever the distortion removal between the adjacent panel boards is performed, it is preferable to reduce the accumulation of the deviation amount by last performing the secondary joining.

Additionally, in the method of manufacturing a vehicle body frame, the length of the other set of face plates in the second direction may be smaller than the length of the one set of face plates in the second direction. In the second joining step, joint plates are arranged in gaps, wherein the gaps are present between the other set of face plates, and the joint plate and the other set of face plates may be joined.

In this case, the panel boards may have, on both sides in the second direction, joint plate receiving portions that regulate movement in a direction in which the joint plates approach the one set of face plates from the other set of face plates. In the second direction, only one side of the joint plate receiving portions may be formed with engaging portions that engage with the joint plates and regulate movement of the joint plates in the second direction, and the joint plates may be formed with engaged portions that engage with the engaging portions.

Additionally, when the other sets of face plates are joined via the joint plate, in the primary joining step, when the butted portion is joined so that the one set of face plates may be butted, a rotary tool may be pressed against the butted portion from the other set of face plates, and the butted portion may be joined by a friction-stir welding method.

In the manufacturing method concerned, a working floor face can be substituted for a jig in order to support the joining portion by placing the panel boards which are on the working floor face with the one set of face plates turned down and by pressing the rotary tool against the butted portion between the one set of face plates from the gap between the other set of face plates to perform the friction-stir welding of the one set of face plates.

Advantageous Effects of Invention

In the present invention, even in a case where the distortion removal between panel boards is required, one set of face plates of a plurality of panel boards are joined and the other set of face plates are not joined, the distortion removal between the panel boards is performed in a state where the connection rigidity between the panel boards is low. Thus, the distortion between the panel boards can be very simply removed. Hence, according to the present invention, the man-hours of a vehicle body frame can be reduced.

DESCRIPTION OF EMBODIMENTS

An embodiment of a method of manufacturing a vehicle body frame related to the present invention will be described below with reference to the drawings.

First, the schematic configuration of a vehicle body in the present embodiment will be described before describing the method of manufacturing a vehicle body frame.

Figure 10:
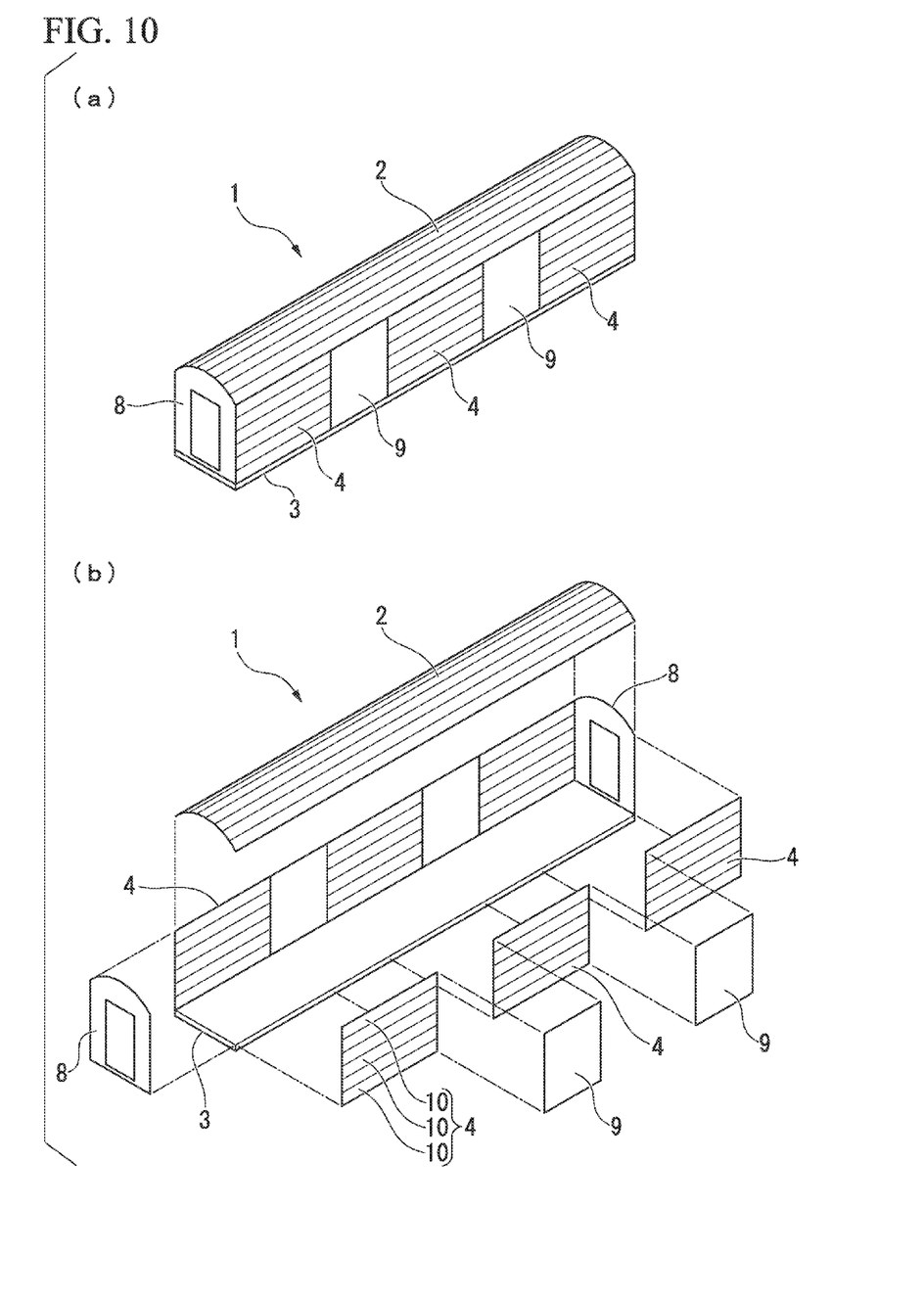
FIG. 10 shows a vehicle body of one embodiment related to the present invention, with FIG. 10(a) being a perspective view of the vehicle body, and FIG. 10(b) being an exploded perspective view of the vehicle body.

A vehicle body frame 1, as shown in FIG. 10, includes, for example, a roof structure 2, a plurality of pairs of side structures 4 that face each other, and a floor structure 3. The roof structure 2 is joined to the upper edge of each side structures 4, and the floor structure 3 is joined to the lower edge of each side structures 4.

In the present embodiment, the roof structure 2, the side structures 4, and the floor structure 3 are all constructed by joining a plurality of metallic panel boards. The structures 2, 3, and 4 are formed such that the longitudinal direction of the plurality of panel boards faces the front-and-rear direction of the vehicle body, and end portions of the plurality of panel boards in the lateral direction are joined.

The vehicle body of the present embodiment is constituted by the vehicle body frame 1 described above, front and rear end structures 8, door structures 9 each having a door mechanism, various interior materials, and the like.

The end structures 8 are formed by, for example, FRP (Fiber Reinforced Plastics) or the like, and are provided at open portions of front and rear ends of the vehicle body frame 1. Additionally, the door structures 9 are aligned at intervals in the front-and-rear direction and provided between the side structures 4.

Next, an embodiment regarding the method of manufacturing a vehicle body frame 1 described above will be described with reference to FIGS. 1 to 7.

The panel boards that constitute the respective structures 2, 3, and 4 all have an inner face plate, an outer face plate that faces the inner face plate, and a plurality of ribs that is arranged between the inner face plate and the outer face plate to connect these face plates, and are called double skins.

Figure 5:
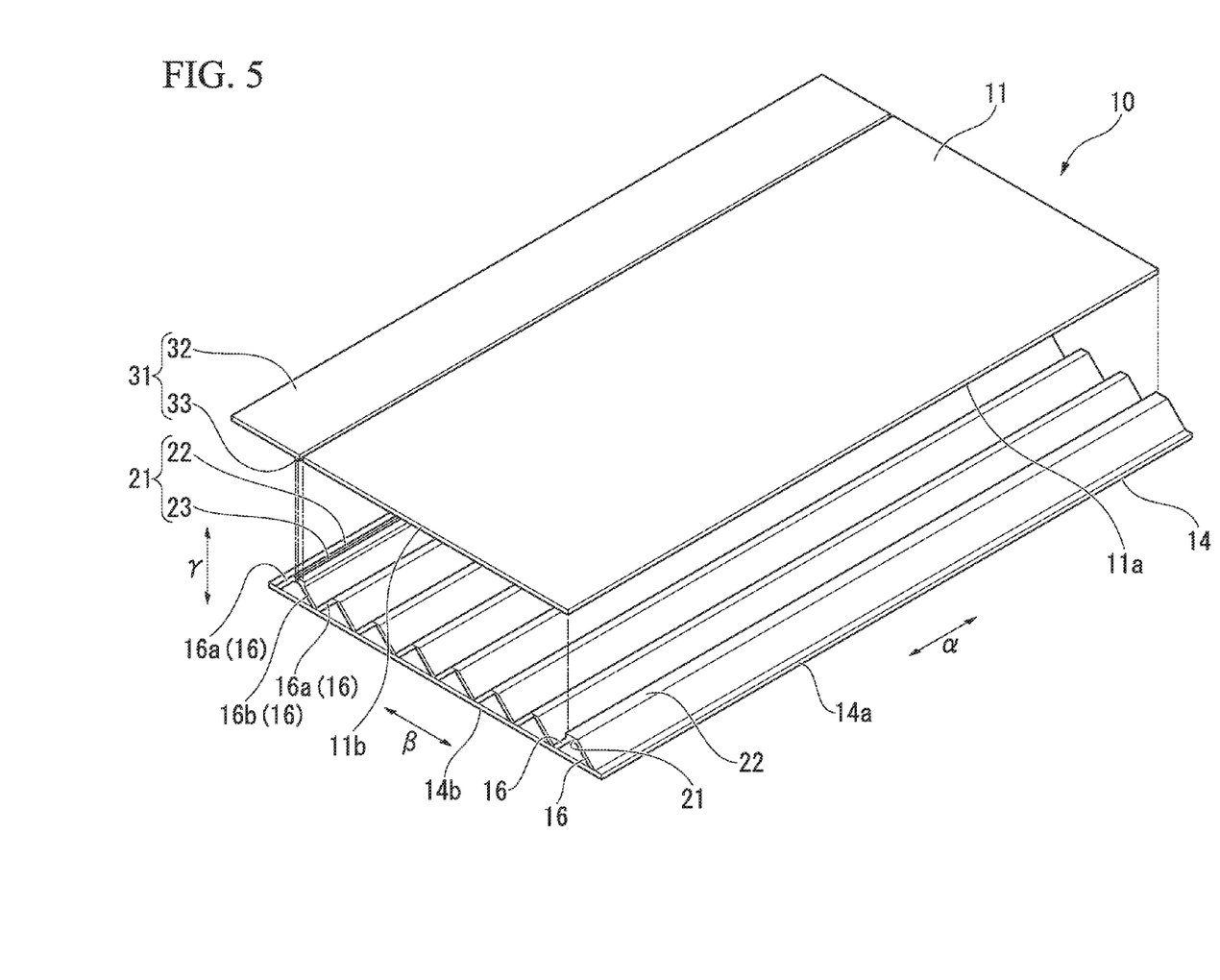
FIG. 5 is an exploded perspective view of a panel board in one embodiment related to the present invention.
Figure 6:
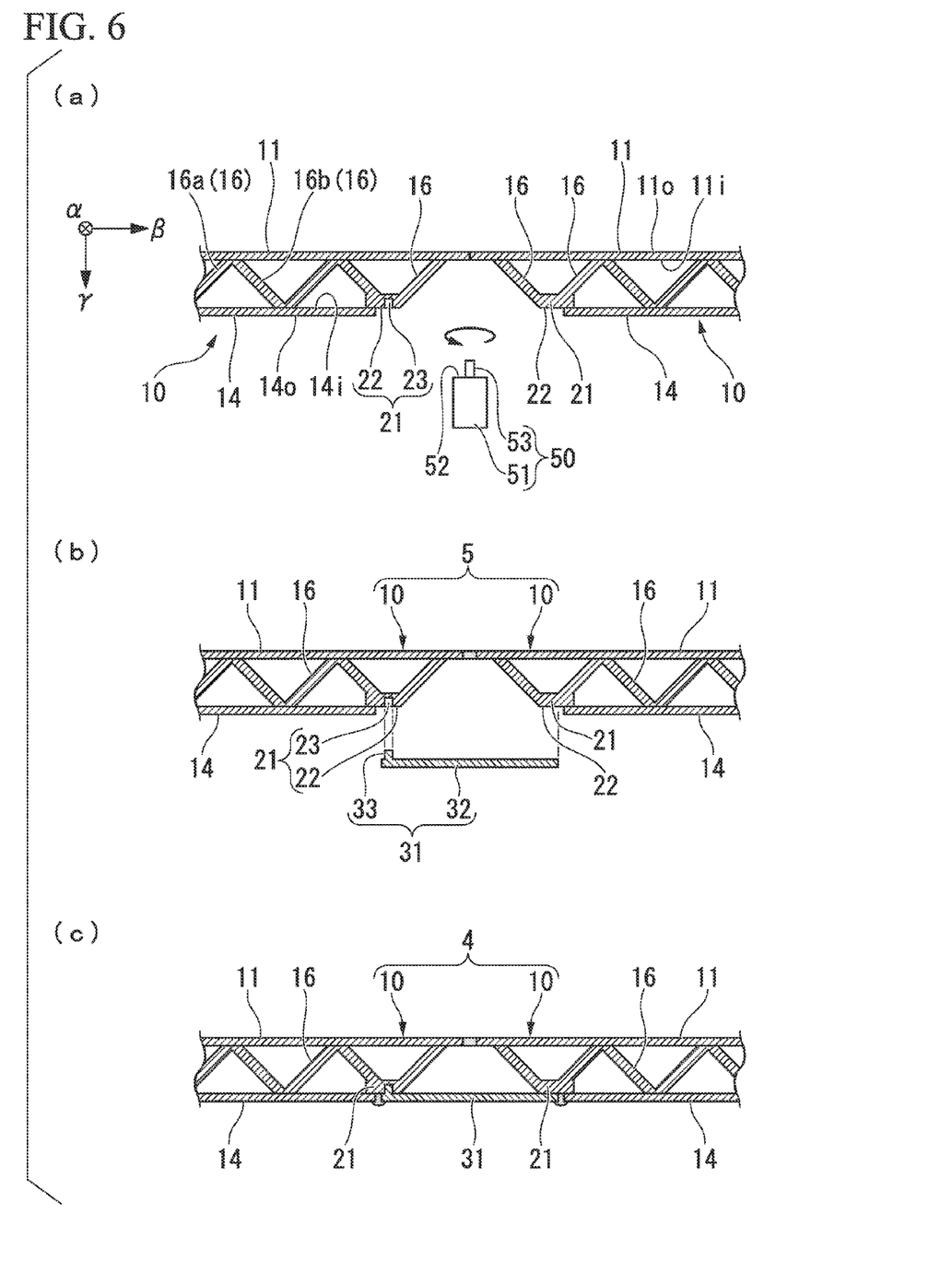
FIG. 6 is explanatory views showing joining process of panel boards of one embodiment related to the present invention, with FIG. 6(a) showing a state immediately before primary joining of the panel boards, FIG. 6(b) showing a state immediately before secondary joining of the panel boards, and FIG. 6(c) showing a state after the secondary joining of the panel boards.

Here, the configuration of the panel boards will be specifically described with reference to FIGS. 5 and 6, taking the panel boards that constitute the side structure 4 as an example.

An outer face plate 11 and an inner face plate 14 of a panel board 10 that constitute the side structure 4 are all rectangular plates, and the lengths thereof in the longitudinal directions are the same. Additionally, the length of the inner face plate 14 in the lateral direction is slightly longer than the length of the outer face plate 11 in the lateral direction. The inner face plate 14 is spaced apart from the outer face plate 11, and the plates are parallel to each other. In this state, a long side 14a of the inner face plate 14 is parallel to a long side 11a of the outer face plate 11, and the position of a short side 14b of the inner face plate 14 and the position of a short side 11b of the outer face plate 11 are the same position in the longitudinal direction of the outer face plate 11. Here, the longitudinal direction of the outer face plate 11 is defined as a first direction $\alpha$, the lateral direction of the outer face plate 11 is defined as a second direction $\beta$, and a direction perpendicular to the first direction and the second direction is defined as a third direction $\gamma$.

A plurality of ribs 16 extends along the first direction and is aligned in the second direction. The plurality of ribs 16 inclines with respect to the outer face plate 11 and the inner face plate 14 when viewed from the first direction. Among the plurality of ribs 16, a first rib 16a forms an angle of 45° with respect to the outer face plate 11, a second rib 16b adjacent to the first rib 16a in the second direction $\beta$ forms an angle of 135° with respect to the inner face plate 14, and the first rib 16a adjacent to the second rib 16b in the second direction $\beta$ forms an angle of 45° with respect to the inner face plate 14. Hereinafter, ribs 16b, 16a, 16b, . . . that are aligned in the second direction $\beta$ form angles of 135°, 45°, 135°, 45°, . . . with respect to the inner face plate 14 similarly to the above.

Joint plate receiving portions 21 are formed on both sides of the panel board 10 in the second direction $\beta$. The joint plate receiving portions 21 are formed by a substantially triangular top portions formed by a rib 16 located at an endmost position in the second direction $\beta$, and a rib 16 adjacent to this rib 16. The joint plate receiving portions 21 are formed in a region where the inner face plate 14 is not present in the second direction $\beta$, and can be observed from the outside.

The joint plate receiving portions 21 have a joint plate receiving faces 22 that is parallel to an outer face (face opposite the outer face plate 11) 14o of the inner face plate 14 and is flush with an inner face (face on the outer face plate 11 side) 14i of the inner face plate 14. An engaging portion 23 that is a groove dented toward the outer face plate 11 is formed in one of the joint plate receiving faces 22 of the joint plate receiving portions 21 at both ends in the second direction $\beta$.

In addition, the panel boards 10 of each structure fundamentally have the above configuration. A thickness of the outer face plate 11, a thickness of the inner face plate 14, the interval between the outer face plate 11 and the inner face plate 14, a number of the ribs 16, a thickness of the ribs 16, a shape of the ribs 16, and the like are vary depending on the rigidity required for the structures 2 and 3. For example, since the panel boards of the floor structure 3 have higher rigidity than the panel boards 10 of the side structures 4, the thickness of the outer face plate or the inner face plate, the interval between the outer face plate and the inner face plate, and the like are greater than the corresponding lengths of the panel boards 10 of the side structures 4.

Figure 7:
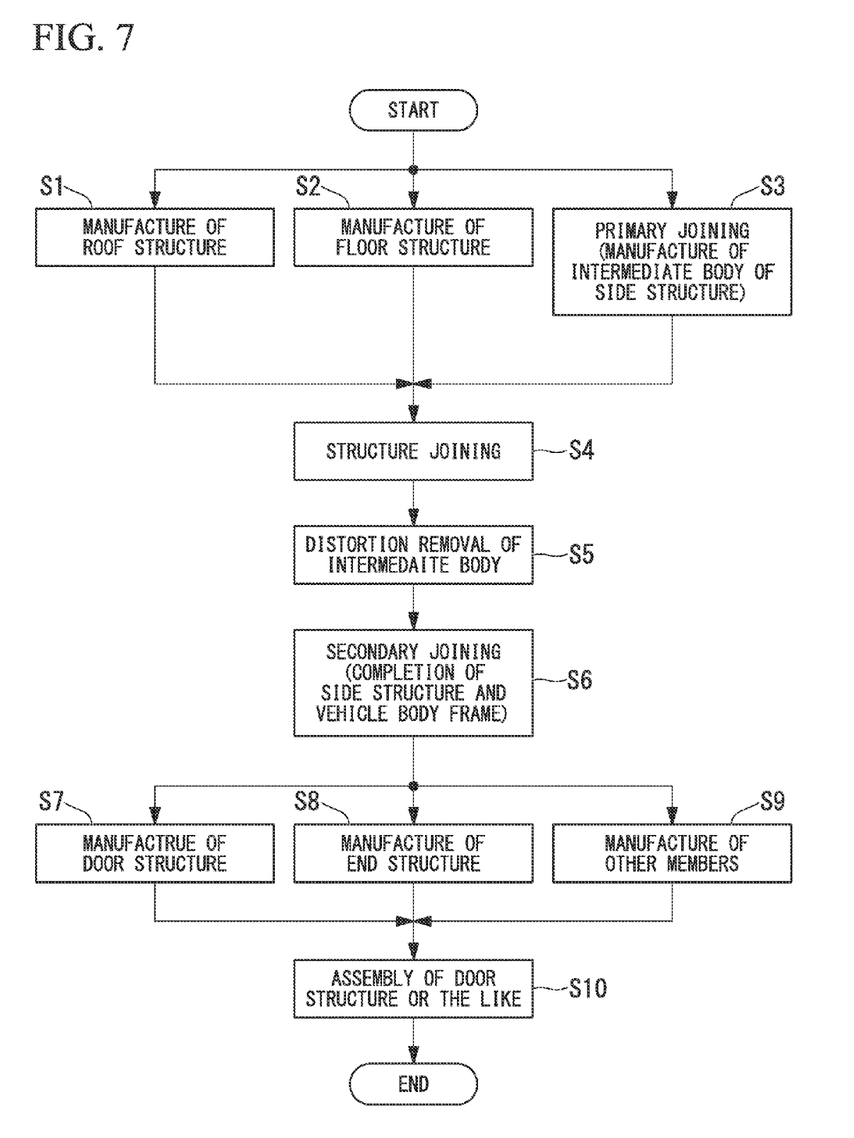
FIG. 7 is a flowchart showing a manufacturing procedure of a vehicle body of one embodiment related to the present invention.

In the manufacture of the vehicle body frame 1, as shown in the flowchart of FIG. 7, first, a plurality of panel boards is joined to manufacture the roof structure 2 (S1), and a plurality of panel boards is joined to manufacture the floor structure 3 (S2). Further, partial joining (primary joining) of the plurality of panel board 10 is performed to manufacture intermediate bodies 5 of the side structures 4 (S3).

When the roof structure 2 and the floor structure 3 are manufactured (S1, S2), the plurality of panel boards is aligned in the second direction $\beta$. Next, a first outer face plate and a second outer face plate adjacent to the first outer face plate are joined by welding, and a first inner face plate and a second inner face plate adjacent to the first inner face plate are joined by welding. As a result, the plurality of panel boards each other is jointed.

In the joining between a plurality of panel boards, distortion occurs between the panel boards under the influence of joining heat. Since the panel boards that constitute the floor structure 3 have higher rigidity than the panel boards that constitutes other structures 2 and 4 as mentioned above, the distortion of the panel boards occurring in the joining between the panel boards that constitute other structures 2 and 4 is relatively small. For this reason, the distortion of the panel boards occurring in the process of manufacturing the floor structure 3 is negligible. Additionally, since the roof structure 2 fundamentally is not conspicuous to a user of a vehicle having the vehicle body frame 1, there is no problem even if distortion is present in the panel boards 10 that constitute the roof structure 2.

However, since the side structures 4 are conspicuous to the user of the vehicle having the vehicle body frame 1, it is preferable to remove distortion in a case where distortion is present in the panel boards 10 that constitutes the side structures 4. For this reason, in the present embodiment, in order to suppress the working labor for this distortion removal, as mentioned above, the intermediate bodies 5 are first manufactured and the side structures 4 are then completed.

In the manufacture of the intermediate body 5, first, as shown in FIG. 6(a), outer face plates 11 of a plurality of panel boards 10 are directed to a working floor face side, that is, to the underside, the plurality of panel boards 10 is aligned in the second direction $\beta$, and the outer face plates 11 of the plurality of panel boards 10 are butted. Next, friction-stir welding of a butted portion between the outer face plates 11 is performed using a rotary tool 50 for friction-stir welding to manufacture and an intermediate body 5.

The rotary tool 50 has a cylindrical shoulder portion 51, and a probe portion 53 that has a smaller external diameter than the external diameter of the shoulder portion 51 and protrudes from a shoulder face 52 that is an end face of the shoulder portion 51. During the friction-stir welding, the probe portion 53 is inserted into a base material while rotating the rotary tool 50, and the rotary tool 50 is moved along a target joining line in a state where the shoulder face 52 is brought into contact with the surface of the base material.

In the case of the present embodiment, the rotary tool 50 is pressed against the butted portion between the outer face plates 11 from between the inner face plates 14 of the plurality of panel boards 10, that is, is moved in the first direction α while downward pressing, thereby performing the friction-stir welding between the outer face plates 11. At this time, the working floor face receives the pressing force of the rotary tool 50.

In addition, in the joining of the outer face plates 11, the rotary tool 50 may be pressed from the side opposite to the inner face plates 14 to perform the friction-stir welding of the outer face plates 11. However, in this case, the working floor face is only present at a predetermined distance from the outer face plates 11 below the portions of the outer face plates 11 against which the rotary tool 50 is pressed, and there is no portion that supports the outer face plates 11 in contact with these portions thereof. Therefore, a jig that receives the pressing force of the rotary tool 50 is required. Additionally, if the rotary tool 50 is pressed from the inner face plates 14 side as described above, the outer faces (faces opposite to the inner face plates 14) 11o of the outer face plates 11 can be finished more finely than a case where the rotary tool 50 is pressed from the opposite side. For this reason, as described above, it is preferable to press the rotary tool 50 from the inner face plates 14 side.

Figure 1:
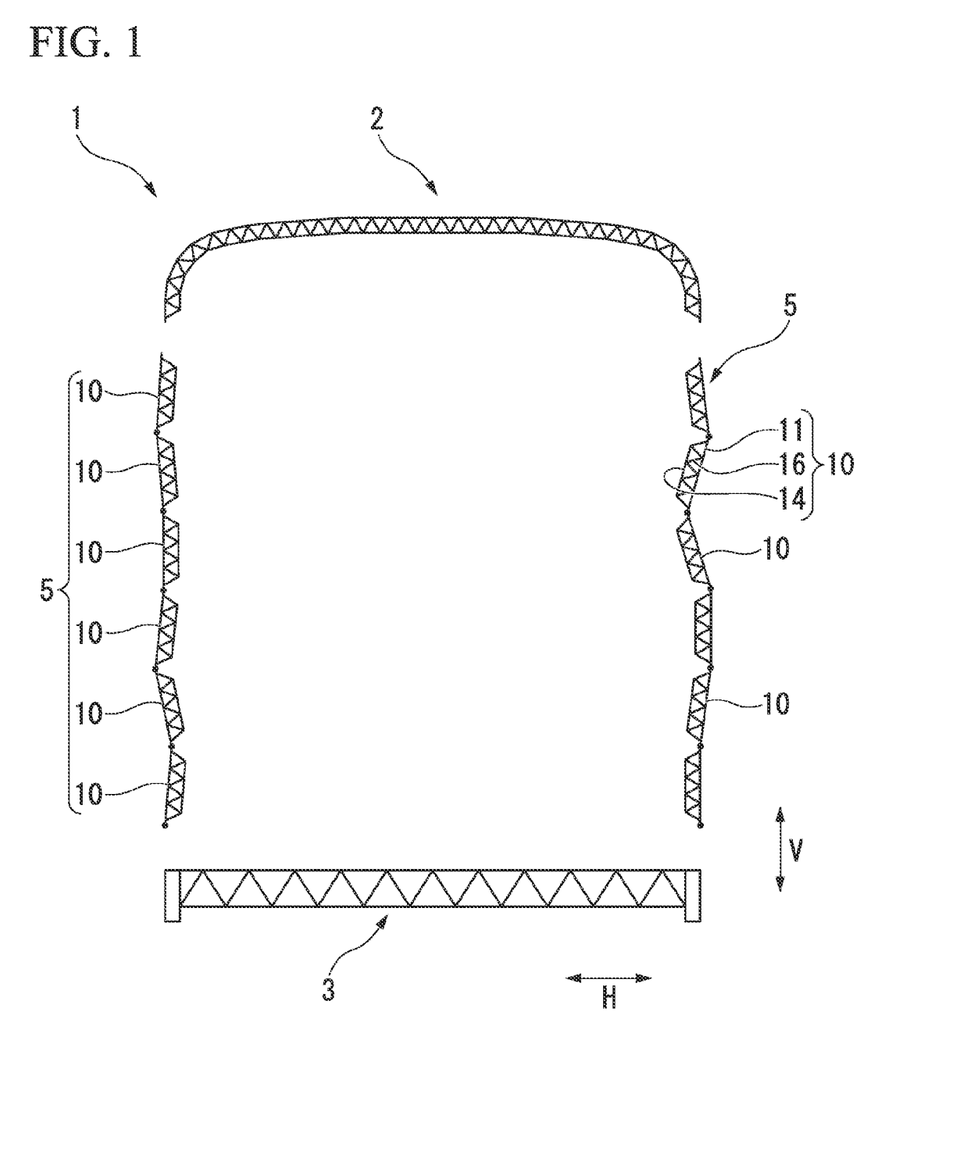
FIG. 1 is a front view of a vehicle body frame immediately before the joining between structures in one embodiment related to the present invention.
Figure 2:
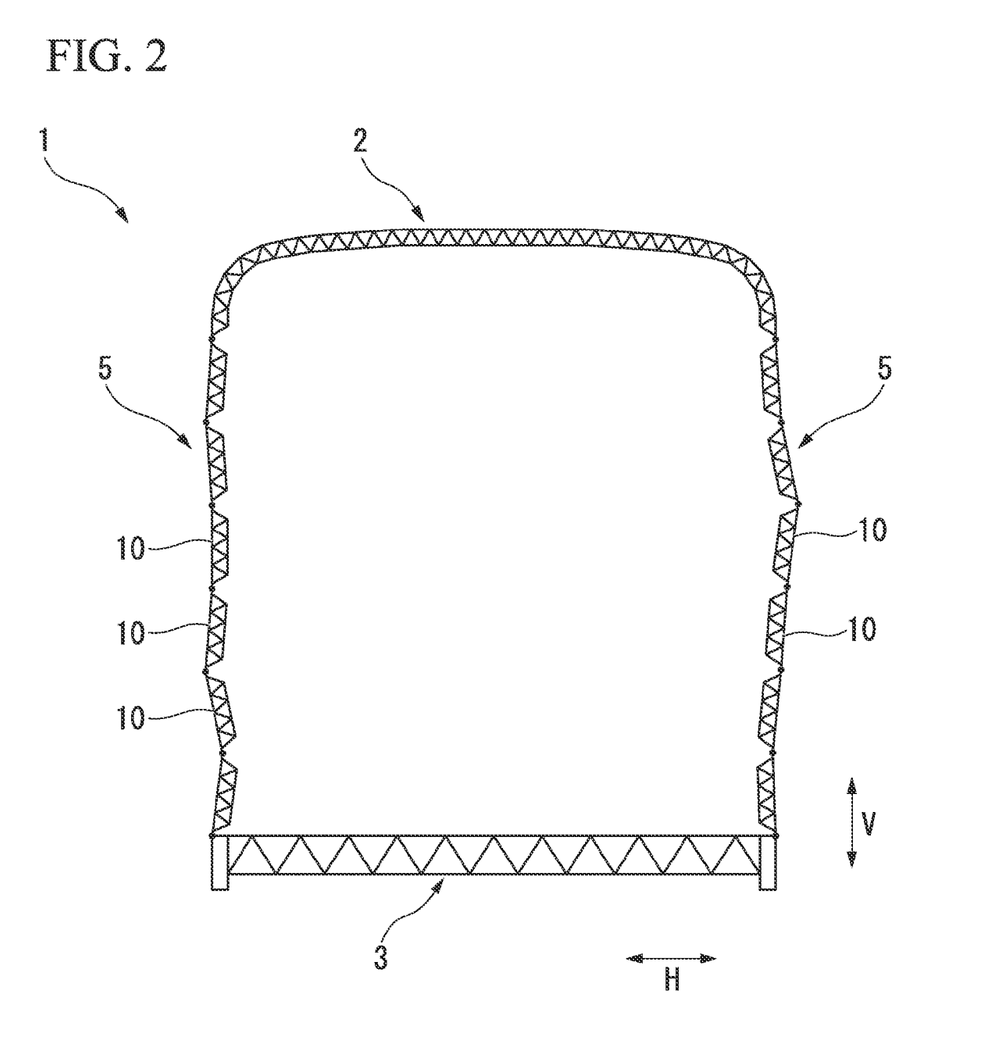
FIG. 2 is a front view of the vehicle body frame after the joining between the structures in one embodiment related to the present invention.

Next, as shown in FIGS. 1 and 2, the roof structure 2, the floor structure 3, and the intermediate bodies 5 of the side structures 4 are joined (S4). At this time, the ribs of the structures 2, 3, and 4 are parallel to the front-and-rear direction of the vehicle body frame 1. Additionally, the plurality of panel boards that constitute the roof structure 2 and the floor structure 3 is aligned in the horizontal direction H of the vehicle body frame 1, and the plurality of panel boards 10 that constitutes the intermediate bodies 5 is aligned in the vertical direction V of the vehicle body frame 1.

Incidentally, among the plurality of panel boards 10 that constitute the intermediate bodies 5, distortion may occur in the process of manufacturing the intermediate bodies 5. For example, as shown in FIG. 2, when the intermediate bodies 5 is seen from the front side, each of the outer face plates 11 of the plurality of panel boards 10 that constitute the intermediate body 5 may not be directed to a target direction. Thus, after joining between the structures 2, 3, and 4 (S4), distortion is removed in a case where the distortion is between the panel boards 10 that constitute the intermediate bodies 5 (S5).

Figure 3:
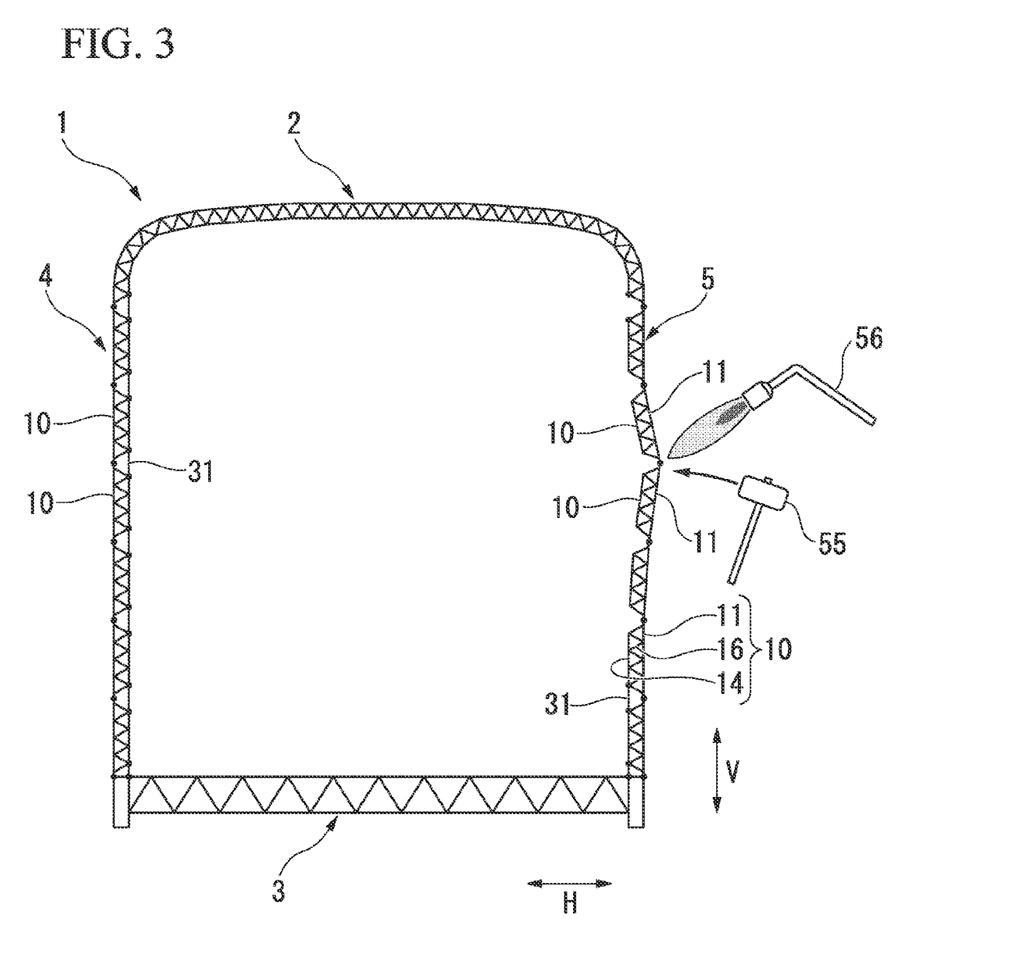
FIG. 3 is a front view of the vehicle body frame during distortion removal and secondary joining in one embodiment related to the present invention.

As a method of removing distortion, as shown in FIG. 3, a method of adding a mechanical load to a joining portion between the outer face plates 11 of adjacent panel boards 10 using a hammer 55 or the like, a method of heating the joining portion using a burner 56 or the like, a method of combining both, and the like are considered. Even if any one of these methods is adopted, when distortion is removed, only one face plate 11 of the two face plates 11 and 14 that constitute the panel board 10 is in a joined state, and the connection rigidity of the adjacent panel boards 10 is still smaller than the connection rigidity in a state where both the face plates 11 and 14 are connected. For this reason, the distortion between the plurality of panel boards 10 that constitute the intermediate body 5 can be very simply removed.

In a state where distortion is removed, the state where the outer face plate 11 of one of the panel boards 10 is joined to the outer face plate 11 of the other of the panel boards 10 at a target angle and the outer face plates 11 of a plurality of panel boards 10 are directed in target directions, respectively. Specifically, in the case of the present embodiment, a state where the outer face plate 11 of one of the panel boards 10 is joined to the outer face plate 11 of the other of the panel boards 10 at 180° and the outer face plates 11 of a plurality of panel boards 10 are aligned in a straight line in the vertical direction, respectively.

If the distortion of the panel boards 10 are removed (S5), the inner face plates 14 of the panel boards 10 are joined (secondary joining) (S6). In this secondary joining, as shown in FIGS. 6(b) and 6(c), the inner face plates 14 are joined using joint plates 31.

The joint plate 31 has a rectangular plate 32. The length of the rectangular plate 32 in the longitudinal direction coincides with the lengths of the inner face plate 14 and the outer face plate 11 of the panel board 10 in the longitudinal direction. Additionally, the length of the rectangular plate 32 in the lateral direction is such a length that a gap formed in the inner face plates 14 of adjacent panel boards 10 can be blocked. Additionally, the thickness of the rectangular plate 32 coincides with the thickness of the inner face plate 14 of the panel board 10.

The joint plate 31 further has an engaged portion 33 that protrudes from one face of the rectangular plate 32 and that fits into and engages with the engaging portion 23 of the joint plate receiving portion 21 of the panel board 10. The engaged portion 33 protrudes from one position in the lateral direction in one face of the rectangular plate 32 and extends in the longitudinal direction of the rectangular plate 32.

When the inner face plates 14 of the adjacent panel boards 10 are joined using the joint plate 31, first, the engaged portion 33 of the joint plate 31 is made to engage the engaging portion 23 formed only in one of the joint plate receiving portions 21, and the joint plate 31 is brought into contact with the joint plate receiving face 22 of each joint plate receiving portion 21. Then, one of the inner face plates 14 and one of a edge of the joint plates 31 are joined and the other of the inner face plates 14 and the other of the edge of the joint plates 31 are joined, by fusion welding, such as MIG (Metal Inert Gas) welding or TIG (Tungsten Inert Gas) welding.

In the joining between the joint plate 31 and the inner face plates 14, the friction-stir welding method may be adopted similarly to the joining between the outer face plates 11. However, in the friction-stir welding, it is necessary to receive a pressing force so that a joining portion does not move in the direction of the pressing force even if the pressing force of the rotary tool 50 is applied. Therefore, in a case where the friction-stir welding of members that are aligned in the vertical direction V, a jig that receives the pressing force of the rotary tool 50 is required on a side of the joining portion, and a lot of time and trouble are taken. For this reason, the aforementioned fusion welding, such as MIG welding or TIG welding, in which a pressing force is not applied to a joining target from the joining tool is preferable in the joining between the joint plate 31 and the inner face plate 14.

Figure 4:
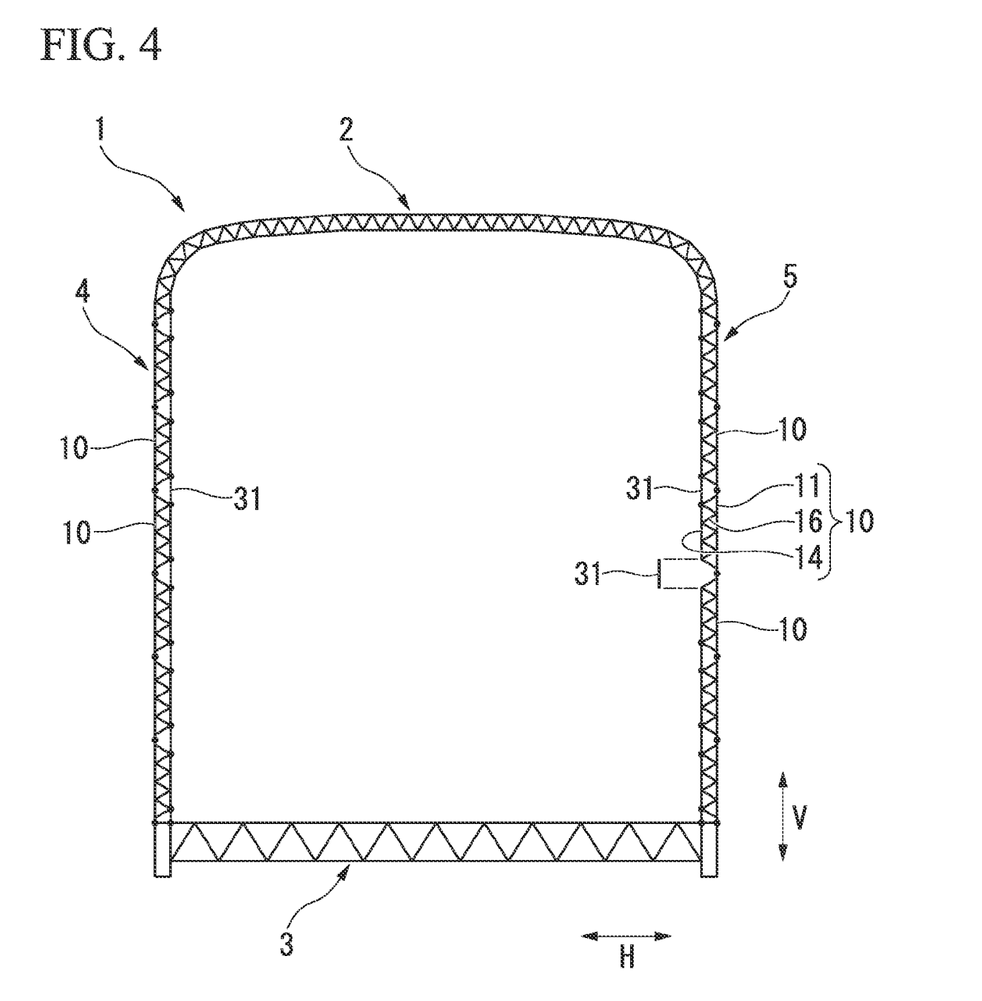
FIG. 4 is a front view of the vehicle body frame after termination of distortion removal in one embodiment related to the present invention.

The joining, that is, secondary joining (S6) of the inner face plates 14 may be performed on all the panel boards 10 that constitute the intermediate body 5, after the distortion between the panel boards 10 is removed (S5). However, as shown in FIGS. 3 and 4, it is preferable to perform the secondary joining between adjacent panel boards 10 (S6) whenever the distortion between the adjacent panel boards 10 is removed (S5).

In this case, it is preferable to perform the distortion removal (S5) and the secondary joining (S6) sequentially from a panel board 10 at an end in the vertical direction V among a plurality of panel boards 10 that constitute the intermediate body 5 (S5), and to last perform the distortion removal (S5) and the secondary joining (S6) between a panel board 10 on the midmost side in the vertical direction V and a panel board 10 adjacent thereto. Specifically, as shown in FIGS. 3 and 4, when six panel boards 10 constitute the intermediate body 5 arranged along the vertical direction V, it is preferable to finally perform the distortion removal S5) and the secondary joining (S6) between a third panel board 10 from below, which is the panel board 10 on the midmost side in the vertical direction V, or a fourth panel board 10 from below, and a panel board 10 (the fourth panel board 10 from below or the third panel board 10 from below) adjacent thereto.

In addition, in a case where odd panel boards 10 constitute the intermediate body 5 arranged along the vertical direction V, for example, in a case where seven panel boards 10 constitute the intermediate body 5 arranged along the vertical direction V, it is preferable to finally perform the distortion removal (S5) and the secondary joining (S6) between a fourth panel board 10 from below, which is the panel board 10 on the midmost side in the vertical direction V, and a third panel board 10 from below or a fifth panel board 10 from below, which is adjacent thereto.

In a case where the distortion removal (S5) step and the secondary joining (S6) step are firstly performed with respect to the panel board 10 located at the upper end side of the vehicle body, and then the distortion removal (S5) step and the secondary joining (S6) step are secondly performed with respect to the panel board 10 located at the lower side of the vehicle body, finally, the distortion removal (S5) step and the secondary joining (S6) step are performed with respect to the panel board 10 located at the bottom side of the vehicle body. If the distortion removal (S5) and the secondary joining (S6) are performed in this order, and if lower panel boards 10 adjacent to an upper panel board 10 in a plurality of panel boards 10 are all inclined to the right side, the deviation amount of lower ends of the lower panel boards 10 to the right side with respect to the upper panel board 10 is accumulated whenever the secondary joining is performed. When the secondary joining is performed on a second panel board 10 from bottom and a first panel board 10 from bottom, the deviation amount of the lower end of the second panel board 10 from bottom to the right side will become quite large. For this reason, in a case where the secondary joining between adjacent panel boards 10 is performed whenever the distortion removal between the adjacent panel boards 10 is performed, it is preferable to performed at end of distortion removal (S5) step and the secondary joining (S6) step.

After the secondary joining (S6) of all the panel boards 10 that constitute the intermediate bodies 5 is completed, the side structures 4 are completed and the vehicle body frame 1 is completed.

Next, other members shown in FIG. 10, such as the door structures 9, the end structures 8, and the interior material, are manufactured (S7, S8, S9), and these are assembled to the vehicle body frame 1, thereby completing a vehicle body (S10). In addition, the manufacture of the other members, such as the door structures 9, the end structures 8, and the interior material, may be performed in any stage, for example, may be performed before manufacture (S1) of the roof structure 2 as long as the manufacture is performed before these are assembled to the vehicle body frame 1.

As described above, in the present embodiment, one set of plates that are one of the face plates 11 of a plurality of panel boards 10 that constitute the side structure 4 are joined to manufacture the intermediate body 5 of the side structure 4, and distortion removal is performed in a state where the other set of face plates 14 of the plurality of panel boards 10 are not joined, that is, in a state where the joining rigidity between the panel boards 10 is not high. Thus, the distortion removal can be simply performed and the number of man-hours of the vehicle body frame 1 can be reduced.

In addition, in the present embodiment, in a plurality of panel boards 10 that constitute the side structure 4, the ribs 16 incline with respect to the respective face plates 11 and 14. However, like the panel boards 10a shown in FIG. 8, there may be adopted panel boards in which ribs 19 perpendicular to the respective face plates 11 and 14 may be perpendicular or ribs inclined with respect to the respective face plates 11 and 14 and ribs perpendicular thereto are mixedly present.

Figure 8:
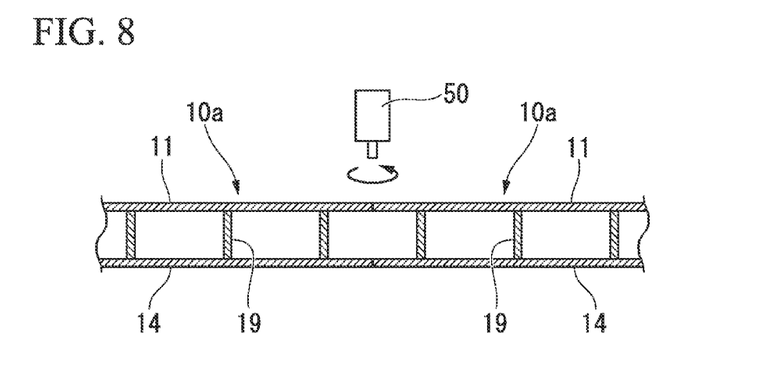
FIG. 8 is a cross-sectional view of panel boards in a modification of one embodiment related to the present invention.

Additionally, in the present embodiment, in the joining between one set of face plates 11 between adjacent panel boards 10, one set of face plates 11 are joined by butting the edges of both, and in the joining between the other set of face plates 14, both are joined via the joint plate 31. However, in the joining between the other set of face plates 14, as shown in FIG. 8, the edges of the other set of face plates 14 may be joined without via the joint plate 31. In this case, although the interval between the edges of the other set of face plates 14 change variously in the process of distortion removal, no problem is caused because an error in a groove size of about 2 to 3 mm is permitted in a number of welding method.

Figure 9:
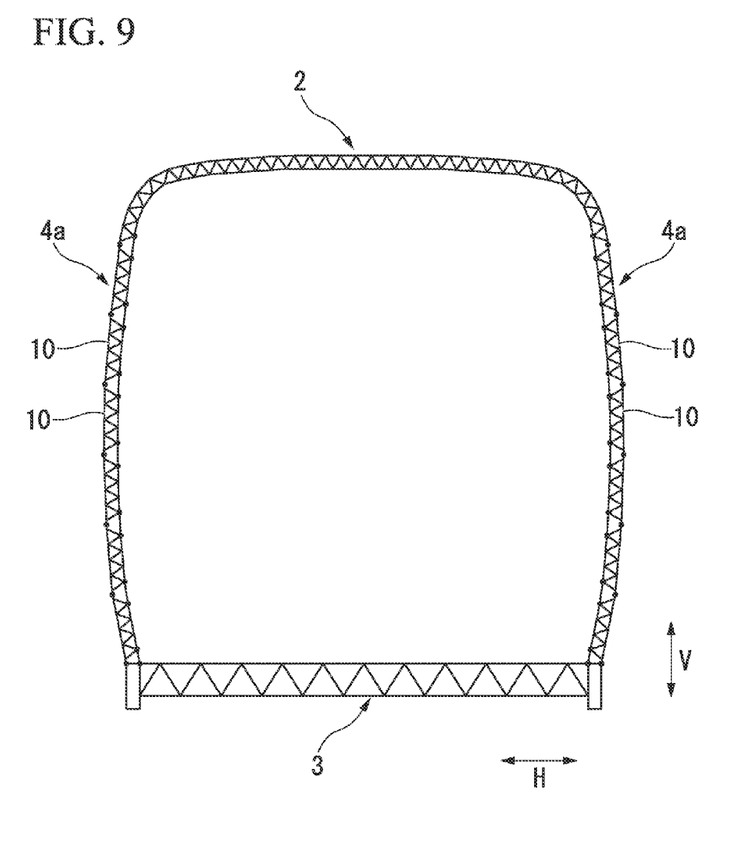
FIG. 9 is a front view of a vehicle body frame in the modification of one embodiment related to the present invention.

Additionally, although a plurality of panel boards 10 that constitute the side structure 4 of the present embodiment is aligned in a straight line in the vertical direction V is adopted, as shown in FIG. 9, a plurality of panel boards 10 that constitute a side structure 4a is aligned in the vertical direction V. but the side structure 4a may be curved in the horizontal direction H. In a case where the side structure 4a is curved in this way, in the present invention, the distortion between the plurality of panel boards 10 that constitute the side structure 4a, in other words, the inclination between the panel boards 10 can be simply adjusted. Thus, the manufacturing method of the present invention can be said to be a very convenient manufacturing method.

Additionally, in the above embodiment, the distortion removal and secondary joining between a plurality of panel boards 10 are performed at different timings. However, the distortion removal and the secondary joining may be simultaneously performed, in other words, the secondary joining may be performed while performing the distortion removal. In this case, at the time of the secondary joining between a plurality of panel boards 10, the amount of heat input caused by the welding at this time is adjusted to generate the distortion in a direction in which the distortion between the plurality of panel boards 10 generated in the primary joining is cancelled, thereby offsetting the distortion at the time of the primary joining and the distortion at the time of the secondary joining. In addition, as a method of adjusting the amount of heat input caused by welding, there is an increase or decrease in welding speed, an increase or decrease are an input current to a welding electrode or the like, and in the case of discontinuous welding, an increase or decrease in welding length, and the like.

Additionally, in the present embodiment, the friction-stir welding method that finely finishes a joining surface in the joining between the outer face plates 11 of a plurality of panel boards 10. However, in a case where this friction-stir welding method is not adopted, the inner face plates 14 of the plurality of panel boards 10 are first joined (primary joining), and then, the respective structures may be joined. Thereafter, the outer face plates 11 of the plurality of panel boards 10 may be joined (secondary joining).

INDUSTRIAL APPLICABILITY

According to the method of manufacturing a vehicle body frame of the present invention, even in a case where the distortion removal between panel boards is required, one set of face plates of a plurality of panel boards are joined, the other set of face plates are not joined, and the distortion removal between the panel boards is performed in a state where the connection rigidity between the panel boards is low. Thus, the distortion between the panel boards can be very simply removed. Hence, according to the present invention, the man-hours of a vehicle body frame can be reduced.

REFERENCE SIGNS LIST

1: VEHICLE BODY FRAME
2: ROOF STRUCTURE
3: FLOOR STRUCTURE
4, 4a: SIDE STRUCTURE
5: INTERMEDIATE BODY
8: END STRUCTURE
10, 10a: PANEL BOARD
11: OUTER FACE PLATE
14: INNER FACE PLATE
16, 16a, 16b, 19: RIB
21: JOINT PLATE RECEIVING PORTION
22: JOINT PLATE RECEIVING FACE
23: ENGAGING PORTION
31: JOINT PLATE
32: RECTANGULAR PLATE
33: ENGAGED PORTION
50: ROTARY TOOL

The invention claimed is:

1. A method of manufacturing a vehicle body frame including a roof structure, side structures that face each other, and a floor structure, wherein the roof structure, the side structures, and the floor structure are formed by a plurality of panel boards, each of the plurality of panel boards having an inner face plate, an outer face plate that faces the inner face plate, and a plurality of ribs disposed between the inner face plate and the outer face plate to connect the inner face plate and the outer face plate, the method comprising:
    a primary joining step of butt-joining only a first set of the inner face plates and the outer face plates of the plurality of panel boards that form the side structures, and manufacturing intermediate bodies of the side structures;
    a structure joining step of joining the roof structure, the floor structure, and the intermediate bodies; and
    a secondary joining step of joining, after the structure joining step, a second set of the inner face plates and the outer face plates of the plurality of panel boards that form the intermediate bodies to complete the side structures.

2. The method of manufacturing a vehicle body frame according to claim 1, further comprising
    a distortion removal step of removing distortion between the plurality of panel boards after the structure joining step.

3. The method of manufacturing a vehicle body frame according to claim 2, wherein
    when the second set of the inner face plates and the outer face plates are joined by welding in the secondary joining step, the distortion removal step is executed during the secondary joining step by adjusting an amount of heat input to a welding portion.

4. The method of manufacturing a vehicle body frame according to claim 1, wherein
    the first set of the inner face plates and the outer face plates are the outer face plates, and
    the outer face plates are joined in the primary joining step.

5. The method of manufacturing a vehicle body frame according to claim 4, wherein
    in the primary joining step, the outer face plates are joined by a friction-stir welding method.

6. The method of manufacturing a vehicle body frame according to claim 1, wherein
    in the secondary joining step, the second set of the inner face plates and the outer face plates are joined by welding.

7. The method of manufacturing a vehicle body frame according to claim 1, wherein
    the plurality of ribs extend along a first direction, and are aligned in a second direction perpendicular to the first direction, and
    in the primary joining step, the first set of the inner face plates and the outer face plates are butt joined in a state where the ribs of each of the plurality of panel boards that form the intermediate bodies are parallel to each other and the plurality of panel boards that form the intermediate bodies are aligned in the second direction.

8. The method of manufacturing a vehicle body frame according to claim 7, wherein
    in the structure joining step, a direction in which the plurality of panel boards that form the intermediate bodies are aligned is a vertical direction, upper edges of the panel boards located at upper ends of the side structures in the vertical direction are joined to the roof structure, and lower edges of the panel boards located at lower ends of the side structures in the vertical direction are joined to the floor structure, and
    in the secondary joining step, the joining between a first of the panel boards near a midmost location in the vertical direction and a second of the panel boards adjacent to the first of the panel boards near the midmost location is performed for each of the intermediate bodies at an end of the secondary joining step.

9. The method of manufacturing a vehicle body frame according to claim 7, wherein
    a length of the second set of the inner face plates and the outer face plates in the second direction is smaller than a length of the first set of the inner face plates and the outer face plates in the second direction, and
    in the secondary joining step, joint plates are arranged in gaps, wherein the gaps are present between the second set of the inner face plates and the outer face plates, and the joint plates and the second set of the inner face plates and the outer face plates are joined.

10. The method of manufacturing a vehicle body frame according to claim 9, wherein
    the panel boards have, on both sides in the second direction, joint plate receiving portions that regulate movement in a direction in which the joint plates approach the first set of the inner face plates and the outer face plates from the second set of the inner face plates and the outer face plates, and
    in the second direction, only one side of the joint plate receiving portions is formed with engaging portions that engage with the joint plates and regulate movement of the joint plates in the second direction, and the joint plates are formed with engaged portions that engage with the engaging portions.

11. The method of manufacturing a vehicle body frame according to claim 9, wherein in the primary joining step, when a butted portion is joined so that the first set of the inner face plates and the outer face plates are butted, a rotary tool is pressed against the butted portion from the second set of the inner face plates and the outer face plates, and the butted portion is joined by a friction-stir welding method.

* * * * *